United States Patent [19]

Martisala

[11] Patent Number: 5,549,189
[45] Date of Patent: Aug. 27, 1996

[54] MACHINE FOR AUTOMATICALLY POSITIONING AND ALIGNING CONTAINERS

[76] Inventor: Jaime Martisala, Ronda SantaMaría 6-8, Barbera Del Valles, Spain, 08210

[21] Appl. No.: 261,896

[22] Filed: Jun. 15, 1994

[30] Foreign Application Priority Data

Jun. 15, 1993 [ES] Spain ................................. 9301324

[51] Int. Cl.⁶ .................................................. B65G 47/24
[52] U.S. Cl. ........................... 198/380; 198/392; 198/400; 198/449
[58] Field of Search ................................. 198/380, 384, 198/392, 393, 400, 448, 449

[56] References Cited

U.S. PATENT DOCUMENTS

| 1,823,995 | 9/1931 | Streby | 327/910 |
|---|---|---|---|
| 3,295,659 | 1/1967 | Aidlin | 436/527 |
| 4,681,209 | 7/1987 | Marti | 198/392 |
| 4,979,607 | 12/1990 | Fogg | 313/591 |
| 5,065,852 | 11/1991 | Marti | 198/392 |
| 5,297,666 | 3/1994 | Marti Sala | 198/392 X |

FOREIGN PATENT DOCUMENTS

| 499038 | 10/1975 | Australia. |
| 277347 | 8/1914 | Germany. |
| 1558379 | 12/1979 | United Kingdom. |

*Primary Examiner*—D. Glenn Dayoan
*Attorney, Agent, or Firm*—Jacobson, Price, Holman & Stern, PLLC

[57] ABSTRACT

A machine for automatically positioning, aligning, and continuously feeding containers, for example, bottles or other hollow articles made from synthetic material, which may be of very different sizes and shapes. The machine includes a main hopper for receiving a plurality of randomly positioned containers. The bottom of the main hopper has a peripheral portion spaced from its side wall to provide a space through which containers can pass. A container holder support is supported below the hopper and includes a peripheral portion for movement in a path adjacent to the peripheral portion of the hopper's bottom. Container holders having recesses for receiving the containers and discharge openings, are mounted on the container holder support for movement therewith. A container support shelf supports the containers in a lying position in the recesses during movement of the container holder, until a discharge section of the support shelf is reached. At the discharge section, the containers are discharged through discharge openings into chutes. The chutes converge over a single annular plane and uprightly position and re-group, in a single row, all of the containers. There are at least two rows of openings in the container holder support for receiving the containers from the hopper. Preferably, a covering mechanism separates the rows of openings in several non adjacent areas, staggered along the peripheral portion of the hopper's bottom so that at each of the areas only one portion of the rows of openings is uncovered to allow passage of containers.

10 Claims, 6 Drawing Sheets

MACHINE FOR AUTOMATICALLY POSITIONING AND ALIGNING CONTAINERS

BACKGROUND OF THE INVENTION

This invention relates to a machine intended for automatically positioning and continuously feeding containers, for example bottles or other hollow articles made from synthetic material, which may be of very different sizes and shapes. Taking into account that the speed of filling machines has increased with the passage of time it is therefore necessary to provide a positioning machine which has a sufficiently high rate of delivery of plastic bottles which are properly oriented and aligned to allow a high production filling machines or similar equipment to operate at its optimum capacity.

Known machines of the type to which the present invention relates include in general:

a) a hopper of any shape or dimension provided with an opening to receive bulk containers that fall onto a bottom plane whose edges are at a distance from the side wall of the hopper providing a peripheral space allowing the passage of the containers;

b) a structure provided with displacement means in an enclosed circuit, located below the bottom plane, including, fully or in part:

a plurality of detachable container holding elements removably mounted at the periphery of the structure defining a series of recesses adapted to receive containers in a lying position and provided with retaining means for one part of the containers, namely their neck, in such a way as to release them in a predetermined position, usually with the neck upward;

a plurality of discharge chutes provided under the recesses for receiving and transferring the containers, while correctly oriented, and aligning them on a fixed bottom towards an exit conveyor that feeds, for example, a bottling line;

c) a plane or shelf, which may be adjustable in height, located below the recesses and over the chutes, designed to support the containers when they are conveyed by the holding elements defining the recesses for receiving and retaining them in a lying position, the plane or shelf being provided with an opening in an unloading area through which the containers fall when moved into position thereover by the container holding elements.

Machines known to the applicant are the following grouped by the function they perform:

a) Aidlin machine (U.S. Pat. No. 3,295,659) which discloses the basic technical feature which facilitates carrying out the upright positioning of the containers, the machine comprising a hopper into which the containers or bottles which are to be sorted are randomly loaded, having an inclined axis, an inclined disc constituting the bottom of the hopper and adapted to rotate about the inclined axis, a plurality of openings at the periphery of the disc each adapted to receive and pass one container while retaining the neck which is supported on the disc for transporting the containers from a receiving zone to an unloading zone, associated with a fixed plate beneath and parallel to the rotatable disc providing a support for the container bodies during their rotation and having a release opening in an upper part of the plate aligned with the path of movement of the containers as the disc rotates, so that the containers fall, by gravity, one by one in an upright position into a fixed chute or guideway located below the opening;

b) AU 499,038 (HOEHN) which discloses the basic technical feature which facilitates carrying out the function of aligning the containers, previously oriented in an upright position in the same machine, according to a principle similar to that disclosed in the aforementioned U.S. Pat. No. 3,295,659, from a plurality of chutes into which the containers fall, in an upright position, the chutes being arranged under each of the openings which are made from annular and radial elements located on the periphery of a rotary disc, rotating at the same speed as the openings and associated with a fixed support and to a recovery conveyor.

The bottom of the machines and/or the rotatable disc or plane having the openings, is, in general, inclined, though it can be constructed in the shape of a cone or frustum of a cone having a vertical axis, as this solution can be found in the state-of-the-art, and it appears disclosed, for example, in patent DE 277347 (Polte) and patent U.S. Pat. No. 1,823,995 (Streby), which refers to machines of the same type as described above, in which case the inclined plane of the rotary element will by virtue of its slope and at the periphery move the containers downwardly thus defining a guiding duct which promotes the passage of the containers toward the openings associated with the falling chutes. The bottom plane, according to the above background prior art, is provided with a rotation movement in the same or opposite sense to the openings for collecting and conveying the containers.

In order to increase the productivity of a machine of the above type, the patent AU 499,038 (HOEHN) proposes the possibility of employing two or more concentric rows of openings adapted to receive containers housed in a lying position, combined with a single or double row of discharge chutes receiving such containers during their fall, arranged in a drum-like annular arrangement.

The patent GB 1,558,379 (HOEHN) which relates to a machine similar to that mentioned in the patent AU 499,038 discloses another example of a machine having a double row of openings located at two levels on the periphery of the rotary disc forming the bottom of the machine, each in correspondence with a series of discharge chutes provided under said openings.

U.S. Pat. No. 4,979,607 (FOGG) likewise discloses a machine having these characteristics with two radially spaced concentric rows of coplanar openings on the periphery of a rotatable disc which communicate with two arrangements of concentric upright discharge chutes which are radially spaced. The containers fall into the discharge chutes and are supported by their bottoms on a second fixed plane, intermediate to the chutes which receive the dropped containers with a development in an arch under 360 degrees, forming thereon two concentric rows, and from said second intermediate plane they pass to a single row formed on a third parallel, fixed plane, at a lower level, to which they have access through discharge chutes alternatively upright and inclined located under the second mentioned intermediate plane provided with an interruption to facilitate the transfer.

The disclosed machines have the following main problems:

the introduction and housing in a lying position of the containers in the rotary collecting openings or recesses, distributed in two or more rows, close to the peripheral edge of the container bottom, is not solved with effectiveness, therefore many of the openings do not even receive containers, some containers remain transverse to the openings and it is necessary to have means applied to eliminate containers incorrectly positioned to avoid perturbations caused by jams;

the inclination of the bottom plane causes an area of accumulation of containers at a lower sector of the receptacle, which makes difficult and ordered access of the containers to the rows of openings;

the machine is hardly adaptable to different sizes of containers, and the access to a discharge chute of an internal row, to eliminate a jammed container is very complicated;

the discharge chutes for receiving falling containers are complex, involving a significant volume and making the production cost of the machine and the servicing tasks more expensive.

BRIEF SUMMARY OF THE INVENTION

One object of this invention is to provide a machine of the above disclosed type which overcomes the above mentioned drawbacks.

According to the invention, the rows' openings are distributed along the peripheral area of the receptacle and under the edge of the bottom plane, in such a way that in several perfectly delimited areas only one of said rows remains open to permit entry of containers, while the remaining rows are closed.

For this aim, covering means such as walls, separate said rows of openings in several non adjacent areas, spaced along said peripheral portion of said bottom, at each of them only one portion of a predetermined length of one of said annular rows of openings is open allowing the passage of the container therein, while the remaining annular rows of openings are covered-up.

In particular, in a preferred embodiment of the machine, two concentric rows of openings having a fixed size and arranged in a quincunx disposition, with open portions thereof distributed along two differentiated areas, in diametrical opposition. Deflecting panels are located within the hopper which extend close to the end of each open area of a row, in the sense of confronting the rotation of the rotary bottom plane, separating the loading areas of each of the rows.

Another characteristic of the invention consists in that, under the two rows of concentric openings, there exists a single arrangement in an annular row of single discharge chutes, independently removable for receiving and transferring the containers, while correctly oriented, the discharge chutes respectively communicating in an alternate form with an opening of the internal row and with an opening of the external row the first ones having an upper inclined portion which extends at the rear of the second ones, whose discharge chutes receive dropping containers from the two rows of openings and align them along a fixed bottom from which they are evacuated by an exit conveyor.

In an alternative embodiment, the machine according to the invention comprises a plurality of concentric, annular elements, arranged at different levels, according to successively increasing diameters, each in relation with its immediate upper one, provided with openings having fixed sizes and carrying a plurality of exchangeable hollow frame-shaped container holders having recesses therein for receiving and holding containers in a lying position, like the ones described in my U.S. Pat. No. 5,415,322 which issued on May 16, 1995. The cited annular elements are linked to a fixed central column by means driving them in simultaneous rotation. Extending below each of these annular elements there is a fixed shelf for supporting containers in a lying position in said recesses during movement of said container holders; and under each means receiving a container, there exists a corresponding discharge chute. The discharge chutes adopt a structure as a drum-like annular arrangement and secure the level-to-level transfer of the containers of each recess toward a single annular plane which re-groups, in a single row, the whole of the containers which are placed upright.

The above and other objects, advantages and features of the present invention will become more apparent from the following description of certain preferred embodiments thereof.

DETAILED DESCRIPTION

Figure 1:
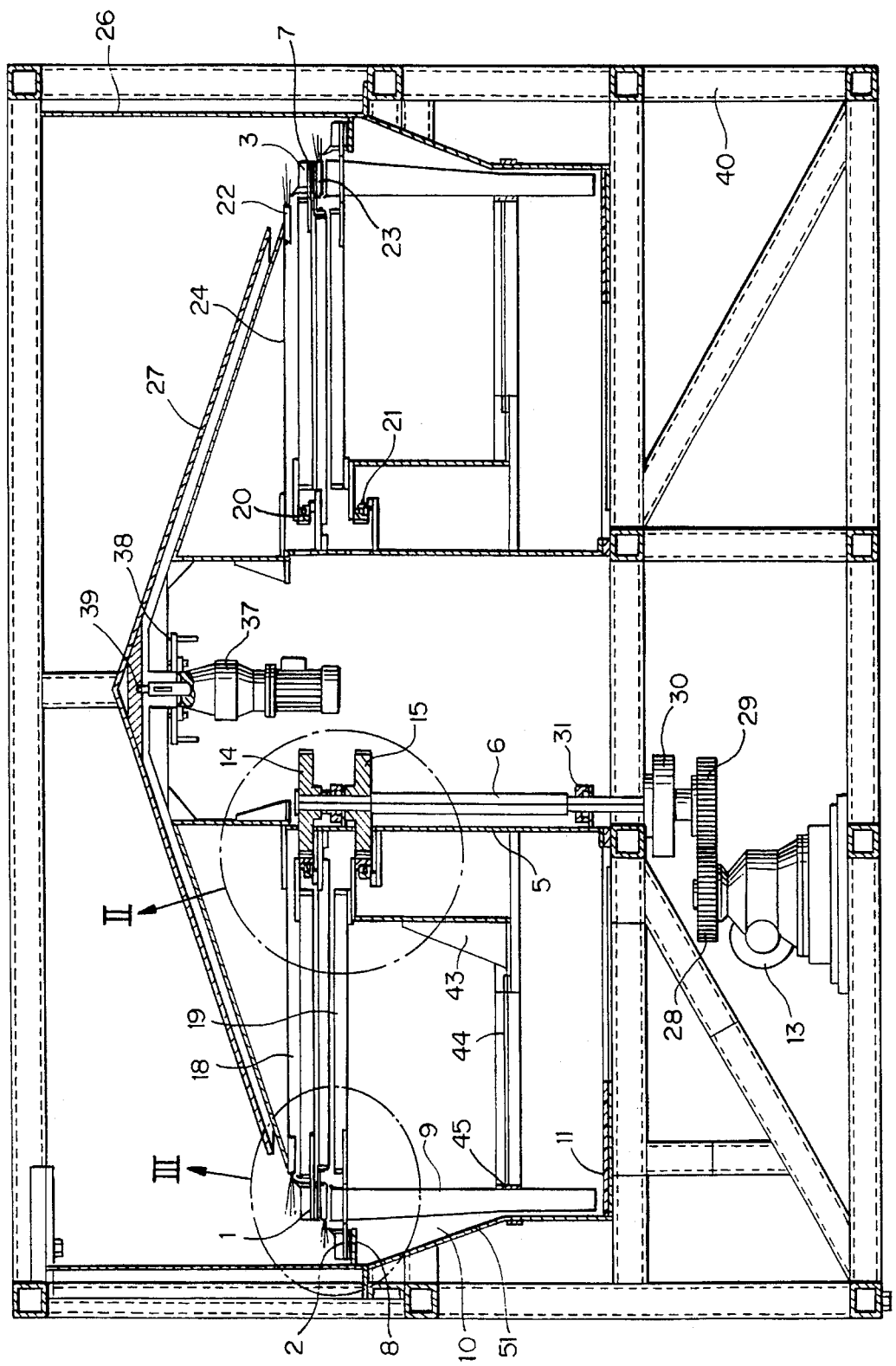
FIG. 1 is a vertical cross-sectional view of a machine according with the invention.
Figure 2:
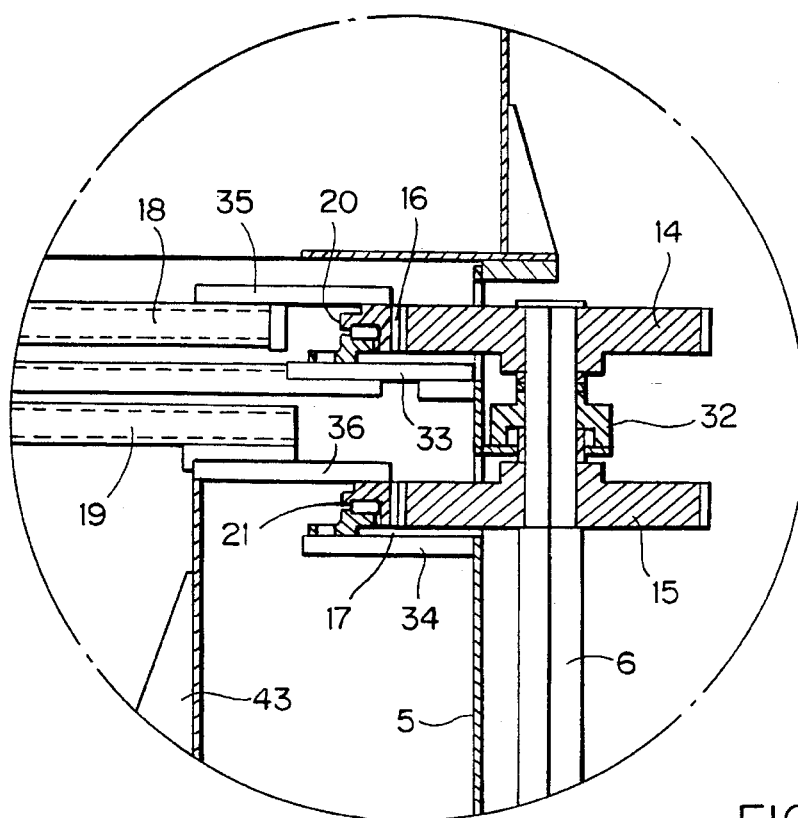
FIG. 2 is an enlarged detail with cross-section of the driving members of the rotatable annular elements of the machine represented in the FIG. 1.
Figure 3:
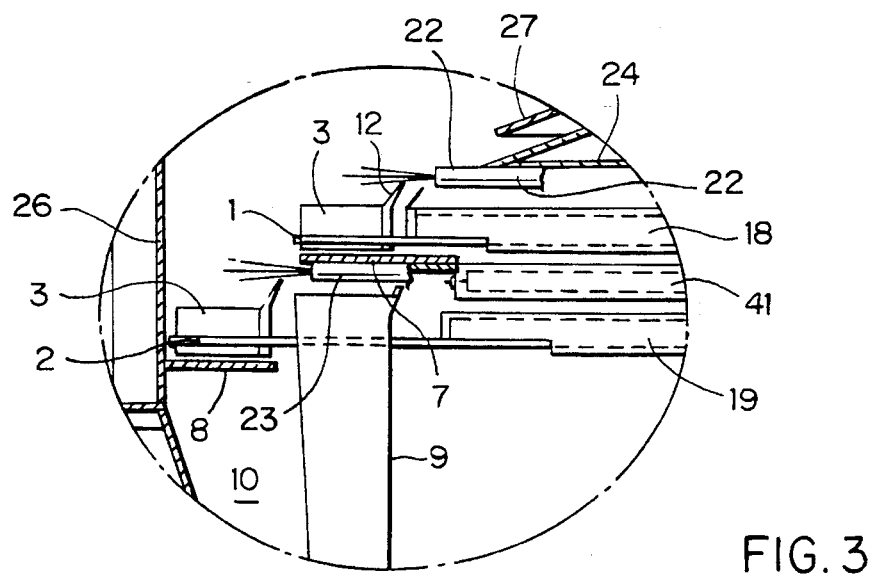
FIG. 3 is a second enlarged detail, of the external portion of the rotatable annular elements.

As can be seen in FIGS. 1 to 3, the machine of this invention includes, on a frame 40, a housing 51 within which are located two concentric, rotary annular elements 1 and 2. The annular elements 1 and 2 are placed at two different levels according to successively increasing diameters, each in relation to its immediately upper one. In addition, the annular elements 1 and 2 bear a plurality of openings 1a, 2a in which there are corresponding container holder elements 3 are at least partly socketed. The container holder elements 3 can be constituted for instance by hollow frame shaped pieces forming recesses (according to a structure described in my U.S. Pat. No. 5,415,322 which issued on May 16, 1995 for receiving and holding the containers 4 in a lying position. The rotary annular elements 1 and 2 are attached to a fixed central column 5 through driving means 6 providing a simultaneous rotation of the annular elements 1 and 2. Extending below each rotary annular element 1 and 2, a corresponding fixed shelf 7, 8 is located for supporting containers in a lying position in the recesses during movement of the container holders 3.

Under the annular elements 1, 2, there are a plurality of independently removable discharge chutes 9 and 10 which ensure the level-by-level transfer of the containers of each means 3 towards a single annular plane 11 which re-groups, in a single row, all of the containers which are already uprightly positioned.

Figure 4:
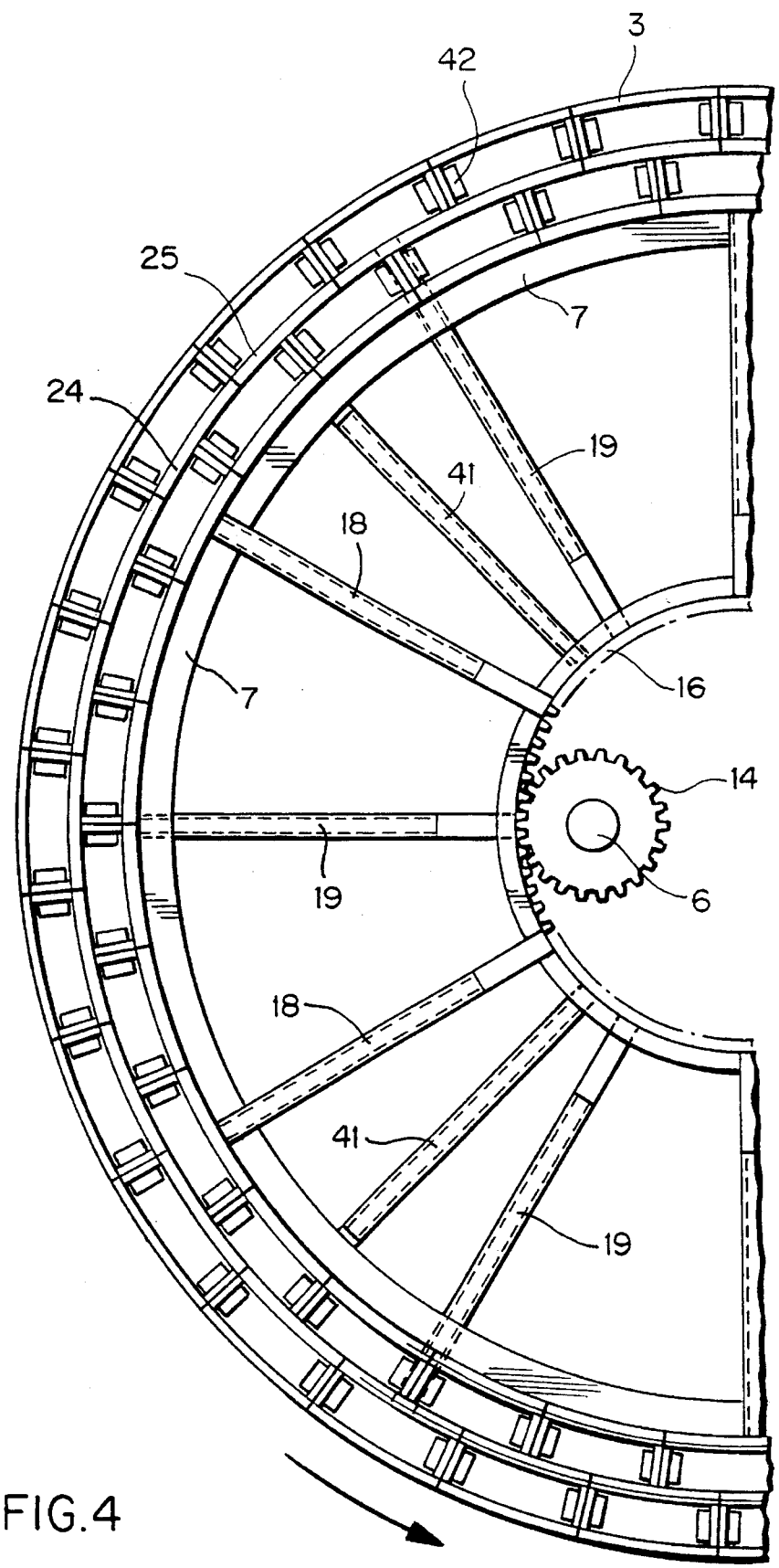
FIG. 4 is a top plan view showing a preferred structure showing the connection of the annular elements to the driving means.
Figure 5:
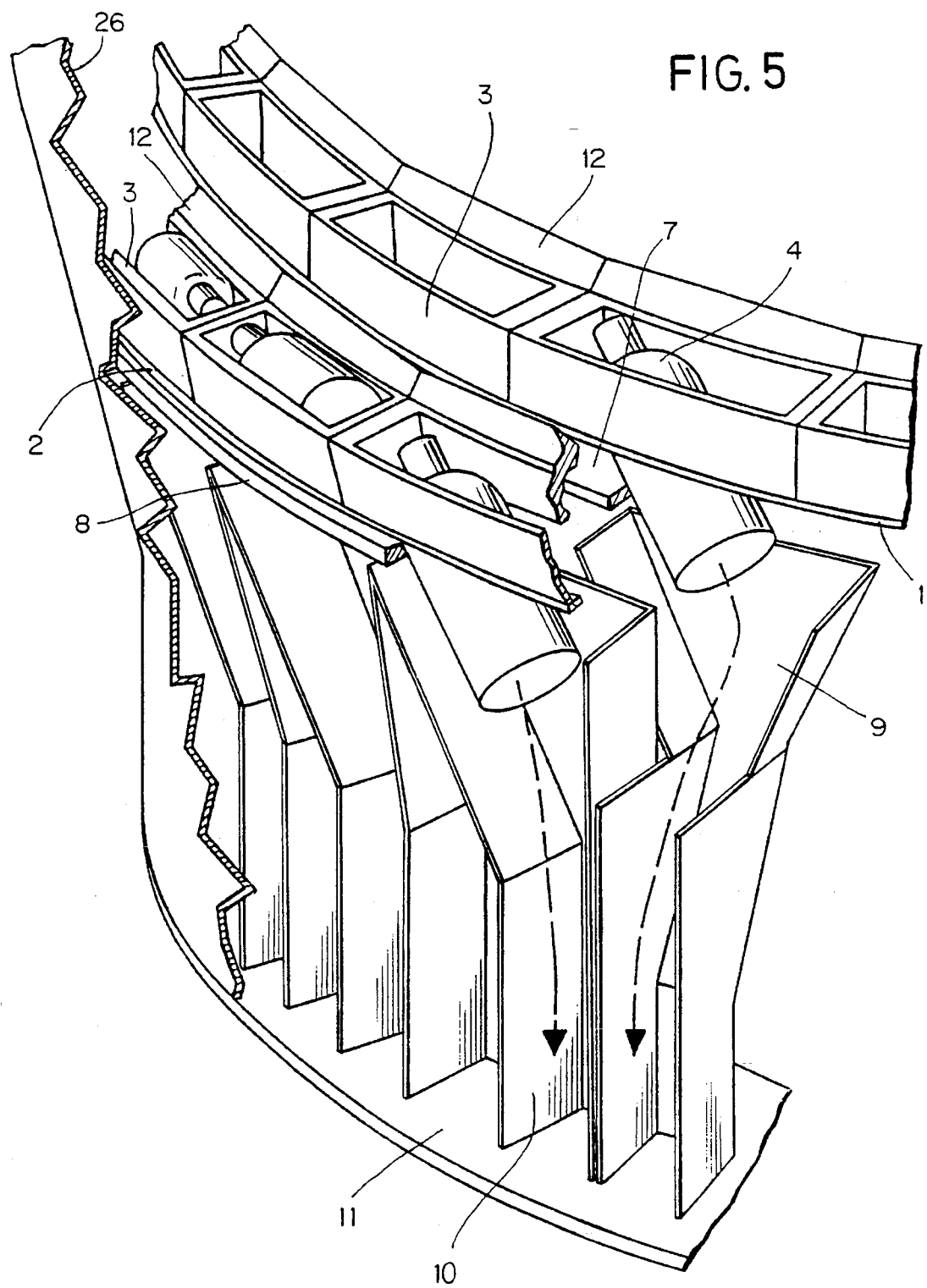
FIG. 5 is a fragmented perspective view, at larger scale, illustrating the structure of the discharge chutes which are convergent on a single alignment row above a fixed bottom.

As can be better seen in FIG. 5, the container holders can be constituted according to a basic structure disclosed in my U.S. Pat. No. 5,415,322 as hollow frame shaped pieces 3, forming recesses for receiving and holding the containers 4 in a lying position from the peripheral space of the bottom plane of the hopper, the container holders having an inner dimension matching that of the containers 4 so that they can receive most of the container body and an external dimension allowing at least one part thereof to fit in corresponding openings 1a, 2a of the rotary annular elements 1, 2. Each container holder comprises in the upper part a charging opening and in its lower part a discharging opening limited by two coplanar flanges 42, for supporting a neck of the containers (see FIGS. 4 and 7). Each container holder 3 has a projecting flange 12 which extends upwards from the inner edge of the charging opening of the container holder provided for securing a gradual passage of the containers to the interior of the recesses and their circulation from one level to the other.

The means for driving the annular elements 1, 2 in simultaneous rotation include a rotary shaft 6 located within the body of a fixed hollow column 5, driven by one of its ends by driving means comprising a motor reducer 13, and a kinematic chain with pinions 28, 29, driving member 30 and coupling member 31, and provided at its other end with two pinions 14 and 15 linked by a coupling 32. The pinions 14, 15 protrude outwardly from the body of the column through suitable openings, and are geared to at least two crown wheels 16 and 17 formed integrally with a respective one of the annular rotary elements 1, 2 by means of a related linking arm 18 and 19 (see FIG. 4), supported by a bearing type joint 20, 21 secured to the wall of the column.

As can better be seen in FIG. 2, the brackets 33, 34 secured to the wall of the column 5 support the bearings 20, 21 by their lower parts. The upper parts of the bearings 20, 21 are closed by plates 35 and 36 which are integral with the internal end of the arms 18 and 19, respectively. The plate 36 has also an integral squared support 43 (see FIG. 1) which is linked by radial arms 44 to a ring 45 which supports the assembly of the discharge chutes 9, 10.

The annular fixed shelf 7 is directly secured to the wall of the fixed central column 5 through the supporting arms 41 while the fixed shelf 8 is directly attached to the wall of the machine housing. Should the machine include over two annular elements 1, 2 then, at least two of the fixed shelfs should be linked to the body of the column 5 by means of radial arms.

In order to facilitate the loading of the containers 4 inside the recesses of the container holders 3 and the circulation thereof from one to another level, nozzles 22 23 may be provided to supply pressurized air. The nozzles 22, 23 are integral with the fixed planes 7 and 24, to evacuate to the exterior the poorly positioned containers 4.

As can be seen in FIG. 1, the bottom plane 27 of the receptacle 26 is constructed in the shape of a cone or frustum of a cone shape, and is associated with a device 37 such as a motor, attached through the support 38, to the higher part of the column 5, whose shaft is terminated in a pinion 39, arranged so that the plane 27 rotates in the opposite sense to rotation of the annular elements 1, 2 and at an independent speed, and cooperating therewith so as to move the containers 4 toward the loading areas.

As is shown in the embodiments of FIG. 1 and 5, the discharge chutes pertaining to a first internal (FIG. 1) or external (FIG. 4) level, possess upright walls allowing a vertical fall of containers 4 directly onto an alignment plane 11 and the discharge chutes pertaining to any other level possess at its upper portion oblique walls and a vertical lower portion allowing transfer of the containers directly onto the single fixed bottom 11 in alignment with respect to the containers from the first level.

Figure 6:
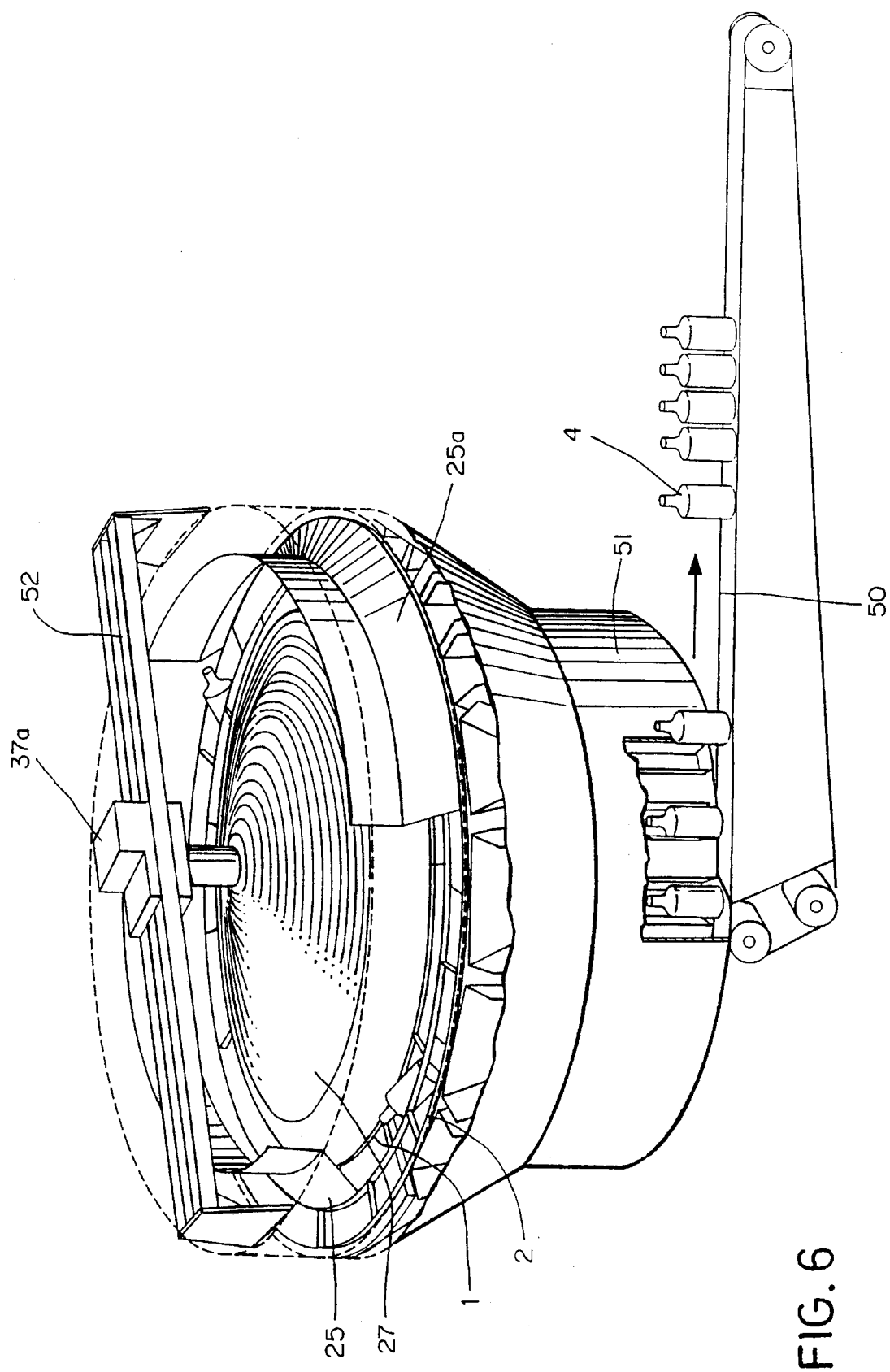
FIG. 6 is a perspective view showing an alternative embodiment of the machine according to the invention provided with rotatable annular elements which are coplanar.
Figure 7:
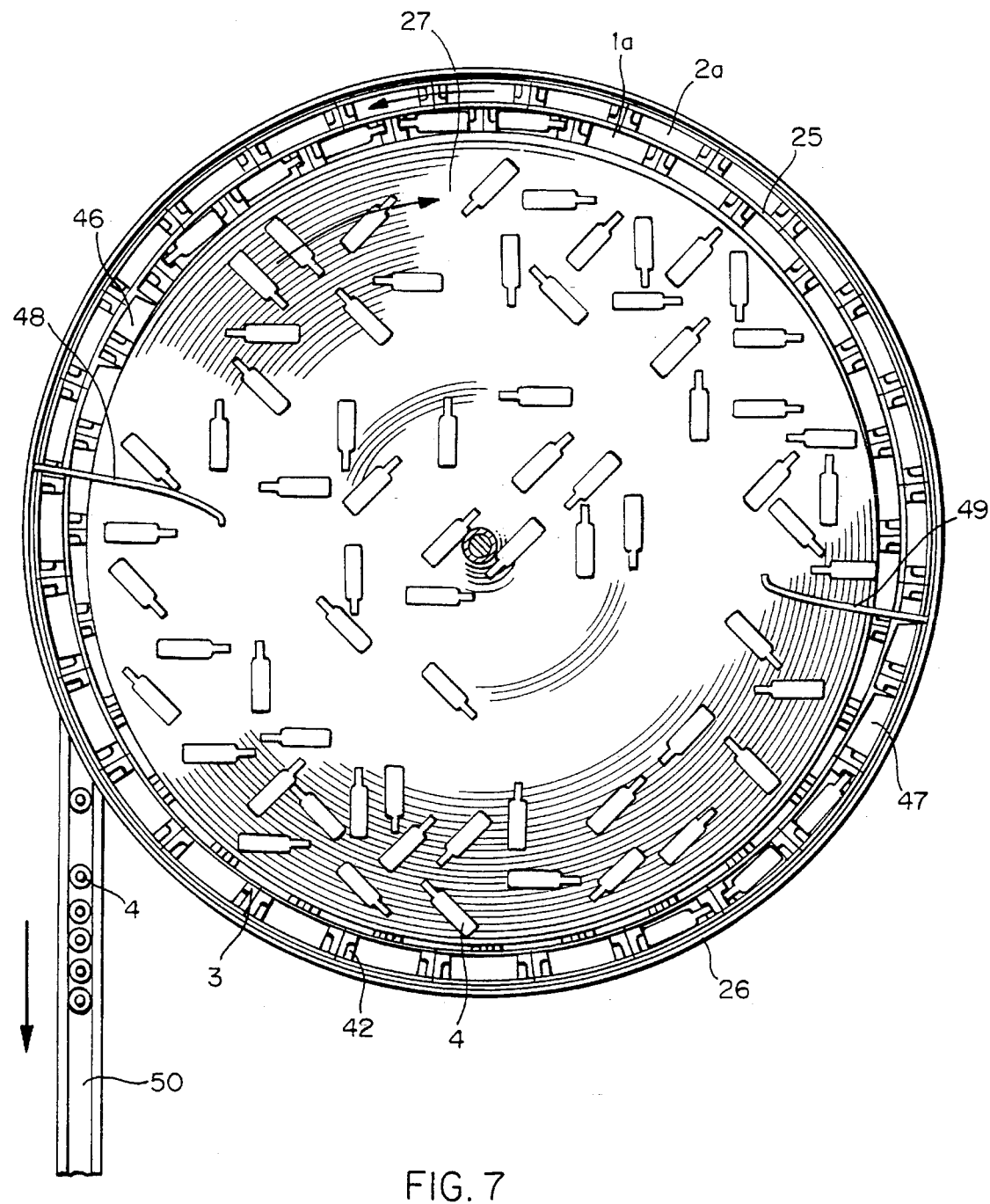
FIG. 7 is a top plan view of the machine of FIG. 6, without the driving means of the rotatable bottom plane thereof.

FIGS. 6 and 7 show an alternative embodiment of the machine in which the rows of openings are constituted by two concentric and coplanar annular rows of openings 1a, 2a having fixed sizes. The covering means separating the open portions of the rows of openings is constituted by a wall 25 and by the outer edge of the rotary bottom 27 of the hopper. In particular, the bottom 27 has a frustum-conical shaped surface rotatable around its axis which is displaced with relation to the central part of the hopper 26 so that the outer edge of the rotatable frustum-conical shaped surface partly covers (see FIG. 7) one of the rows and its slope facilitates a downward movement of the containers toward the related row of uncovered openings. The discharging areas of the containers 46 and 47 (see FIG. 7) are defined at diametral opposite areas. Deflecting panels 48 and 49 delimit each of the loading areas of containers towards the container holders 3 fitted in the openings 1a, 2a. An inclined lower portion 25a of the wall 25 cooperates in guiding the containers in a lying position towards the peripheral recesses.

FIG. 6 clearly shows the operation of the machine and the exit conveyor 50 which evacuates the containers while in an upright position from the machine.

I claim:

1. A machine for automatically positioning and aligning containers, such as plastic bottles, comprising:

a main hopper for receiving a plurality of randomly positioned containers and having a central part;

a side wall on said main hopper;

a bottom in said main hopper having a peripheral portion spaced from said side wall to provide a space through which containers on said bottom can pass;

a container holder support means having a peripheral portion and supported below said hopper for movement of said peripheral portion thereof in a path adjacent said peripheral portion of said bottom;

means for driving said container holder support means in said path;

container holder means mounted on said container holder support means for movement therewith and having recesses therein for receiving and holding containers in a lying position from said peripheral portion of said bottom;

discharge openings in said container holder means for allowing containers to pass therethrough;

container support shelf means extending below said container holder means for supporting containers in a lying position in said recesses during movement of said container holder means;

a discharge section in said support shelf means for discontinuing support of containers at a predetermined location so that containers in said container holder means pass through said discharge openings at said discharge section;

tilting means on said container holder means engaging a part of each container for tilting each container into a predetermined position as each container passes through said discharge openings at said discharge section;

chute means mounted below and movable with said container holder means for receiving, orientating and guiding containers passing through said discharge openings into a predetermined position, moving said containers along a fixed bottom from which they are evacuated by an exit conveyor, said container holder support means comprising at least two rows of openings surrounding said peripheral portion of said bottom; and covering means for separating said rows of openings in several non adjacent areas, staggered along said peripheral portion of said bottom, so that at each of said areas only one portion of a predetermined length of one of said rows of openings is uncovered allowing the passage of the container therein, while the remaining annular rows of openings are covered-up, and wherein said chute means comprise a plurality of independently removable discharge chutes which converge over a single annular plane and which uprightly position and re-group, in a single row, all of said containers.

2. The machine as claimed in claim 1 wherein:

said container holder support means comprises at least two concentric annular rows of openings having fixed sizes.

3. The machine as claimed in claim 2 wherein:

said openings of said two concentric rows of openings are arranged in a quincunx disposition.

4. The machine as claimed in claim 3 wherein:

said plurality of independently removable discharge chutes comprises a drum-like annular arrangement of chutes respectively communicating in a successive alternate form with an opening of one of said rows and with an opening of the other row, one of said alternate series of chutes having a vertical development and the other alternate series of chutes having an upper portion with an inclined orientation and a lower portion vertical so that the lower part of all of the chutes remains over a single fixed annular bottom.

5. The machine, according to claim 1, wherein:

said bottom of said main hopper is constituted by a frustum-conical shaped surface having an outer edge which is rotatable around its axis, said axis being displaced in relation to said central part of said main hopper so that said outer edge of said rotatable frustum-conical shaped surface partly covers one row or the other, a slope of said frustum-conical shaped surface facilitating a downward movement of the containers toward uncovered ones of said openings in said rows.

6. The machine as claimed in claim 1 wherein said container holder support means includes at least two concentric, annular rotary elements arranged on two different levels according to successively increasing diameters, each in relation with its immediately upper one, and bearing a plurality of said container holder means to house the containers in lying position, said annular rotary elements being linked to a fixed central column through driving means in simultaneous rotation with said annular rotary elements;

wherein said container support shelf means include an annular fixed shelf located under each of said rows of openings pertaining to one of said annular rotary elements;

and wherein said plurality of individually removable discharge chutes are arranged so as to provide level-by-level transfer of the containers of each container holder means toward said single annular plane.

7. The machine according to claim 6, wherein;

said driving means comprise a rotary shaft located inside said fixed central column and driven by a motor and provided with at least two pinions protruding outwardly from said fixed central column through suitable openings, said at least two pinions being geared to at least two crown wheels which are integral with respective ones of said annular rotary elements by means of linking arms and being supported by a bearing type joint secured to a wall of said fixed central column.

8. The machine according to claim 7, wherein:

one of said annular fixed shelves is directly secured to the outer wall of the fixed central column.

9. The machine according to claim 7 and further comprising:

nozzles supplying pressurized air, integral with one of said annular fixed shelves and secured to a fixed plane located between said annular rotary elements to convey incorrectly positioned ones of said containers in an outwardly direction.

10. The machine according to claim 7, wherein:

each area for loading the containers in said container holders is delimited, level by level, by walls which are angularly staggered in relation to those corresponding to an upper or lower level.

* * * * *